Jan. 4, 1966 T H SPENCER 3,227,586
TRACK PIN BUSHING
Filed Aug. 19, 1963
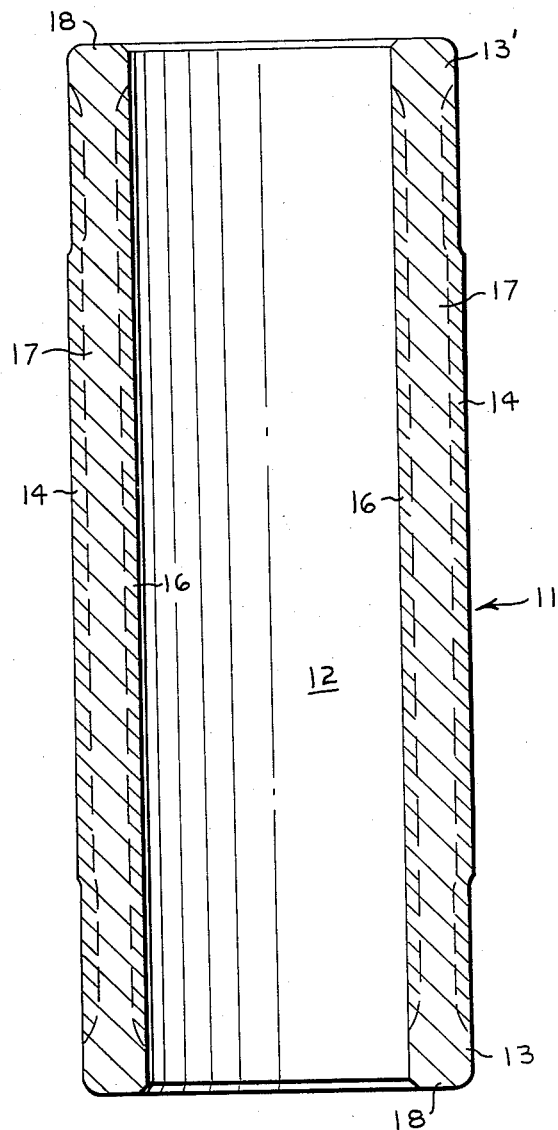
INVENTOR.
T H SPENCER
BY
ATTORNEYS 3,227,586
TRACK PIN BUSHING
T H Spencer, Peoria, Ill., assignor to Caterpillar Tractor Co., Peoria, Ill., a corporation of California
Filed Aug. 19, 1963, Ser. No. 302,907
4 Claims. (Cl. 148—36)

The present invention relates to track pin bushings and more particularly to track pin bushings that are fabricated from a boron containing low carbon steel.

In an endless track for track type vehicles comprising a plurality of track shoes, pivotally connected by means of pins, it is conventional practice to provide bushings within which the pins rotate or pivot. Each track shoe is thereby connected and the track is articulated. Such pin bushing connecting linkage is in universal use on track type vehicles and many examples of these linkages have been disclosed in the prior art. For instance, U.S. Patents No. 2,481,784 issued September 13, 1949 to R. Roman, No. 2,699,974 issued January 18, 1955 to J. L. Deffenbaugh, and No. 2,823,081 issued February 11, 1958 to R. E. Mayo, all disclose various track shoe linkages employing a pin bushing combination.

The track mechanism and especially the pin bushing linkages are subject to very severe strains and stresses due to the constant pivotal movement under heavy loading conditions. The pins and bushings are therefore, subject to rapid wear requiring frequent repair or replacement. Because of the severe wear to which such linkages are subject, expensive alloy materials exhibiting special properties for this use have often been utilized as bushing material. However, such materials add considerably to the cost of the track mechanisms and are, at times, difficult to obtain in industry. On the other hand, low-carbon manganese steels commonly used as bushings exhibit an undue incidence of field failures indicating a need for bushings exhibiting longer life properties.

The present invention provides a low cost, low-carbon steel, which when treated and hardened as hereinafter disclosed provides a superior bushing for use in such track linkages.

It is therefore, an object of the invention to provide an improved, longer wearing track pin bushing.

It is another object of the present invention to provide an improved longer wearing track pin bushing that is fabricated from a boron containing low-carbon steel.

A still further object of the invention is to provide a method for producing an improved longer wearing track pin bushing from a boron containing low-carbon steel.

Yet another object of the invention is to provide a case hardened track pin bushing having a core of completely martensitic microstructure.

Other objects and advantages of the invention will be made apparent in the following specification wherein reference is made to the accompanying drawing.

The single drawing of the application, herein designated as the figure, is a cross-sectional longitudinal schematic view of the track pin bushing of the invention.

It should be understood that the figure illustrates but one track pin bushing configuration. Variations in the shape of the bushing such as thicker walls, deeper fillets and the provision of other special features may be made therein to adapt the bushing to particular linkage configurations. However, such changes will not affect the distinctive feature of the present invention and they should be considered as included in the present description.

The figure illustrates a track pin bushing 11 which is generally of a cylindrical shape. The cylinder is hollowed out to provide a cylindrical longitudinal bore 12 therethrough. Each end of the bushing is turned down to provide a narrower end portion 13 and 13' whereby the bushing may be press fitted into lugs provided on the ends of the track shoes (not shown).

During manufacture, the bushing is case hardened (as hereinafter described) to form a hardened portion 14 extending around the periphery of the bushing as well as a hardened portion 16 extending around the interior of the bushing. The hardened case material extends into and blends into the softer tough core 17.

Due to the particular conditions under which a track pin bushing must operate, it has been found to be advantageous to provide a hard case which will resist wear about a softer, more ductile core structure which will resist shocks and crack propagation. It has been found that by suitably treating a boron containing low-carbon steel such a desired structure may be manufactured which exhibits improved properties.

The raw steel material used in the production of the track pin bushing of the present invention is a low-carbon steel incorporating a suitable ingredient to impart the desired hardenability property thereto. It has been found that inclusion of relatively small amounts of born in such a low-carbon steel yields a raw steel which will develop the desired hardenability upon suitable treatments hereinafter described. More specifically, a steel having alloying elements in the following amounts is preferred for the invention:

Percent by weight
Carbon _____ 0.10—0.22
Manganese _____ 0.60—1.50
*Silicon _____ 0.15—0.30
Boron _____minimum__ 0.0005
Other elements in percentages less than alloying amounts:
Iron—Remainder.

* Any other suitable deoxidizer element may be used in sufficient quantity to produce a fully-killed (deoxidized) steel.

The percentages of alloying elements listed above represent the maximum and minimum amount found to produce a suitable steel for use in the track pin bushings. It will be recognized that the preferred material has alloying elements within the ranges as set out above. For instance, in an actual production run in fabricating track pin bushings the steel had the following composition:

Percent
Carbon _____ 0.17—0.18
Manganese _____ 1.05—1.07
Silicon _____ 0.23—0.25
Boron _____ 0.0015 and small non-alloying quantities of:

Nickel            Copper
Columbium         Aluminum
Molybdenum        Tin

It should be further noted that no upper limit to the amount of boron added to the steel is indicated above. This is so since no upper limit beyond which boron should not be added to the steel has yet been found. However, it is preferred to keep the addition of boron to the steel as low as is compatible with the production of a finished product having a boron percentage as close to the minimum amount indicated above as possible. This is done from the standpoint of economic consideration, but it should be understood that additional amounts of boron may be added to the steel without adversely affecting the properties of the finished product. Thus, as shown above in an actual production run, a steel containing three times the minimum amount of boron was used and the pin bushings produced therefrom exhibited excellent properties.

Steels containing alloy elements as indicated are available on order from any number of commercial sources and no special or unusual manufacturing procedures are necessary for their production. In any event, steels having the above noted composition are used as the raw material for the production of the track pin bushings of the present invention.

Starting with the raw material steel as indicated above, bushings of a configuration as illustrated in the figure are extruded and/or machined therefrom. The rough bushings are subsequently processed as hereinafter described to produce the case hardened bushing of the present invention.

The rough bushings, having been extruded or machined to shape, are then subjected to a heat treatment consisting first of a carburizing treatment as follows. The bushings are placed in a carburizing furnace of conventional construction where they are subjected to gas carburizing at a temperature of approximately 1750° F. for a period of about 26 hours. The carburized bushings are then cooled in the furnace for a period of about 7 hours. This carburizing treatment produces a casing on the bushing parts.

The carburized parts are then subjected to a hardening treatment consisting of placing them in a furnace and raising the temperature to from about 1600 to 1650° F. and maintaining them at that temperature for a period of about 1 hour.

The hot parts are then subjected to a drastic water quench to produce a hardened structure. This drastic water quench may be advantageously carried out in a quenching device such as that shown in U.S. Patent No. 2,724,394 issued November 22, 1955, to T. H. Spencer. Such a quenching treatment has been found to be essential to the production of the superior pin bushings of the present invention.

Starting with a low-carbon boron containing steel as discussed and subjecting it to the heat treatment as herein described produces a pin bushing having a metallurgical microstructure essentially 100% tempered martensite. More specifically, metallurgical examination of the track bushings of the invention revealed that the core structure is essentially complete martensite, while the case 14 and 16 is principally martensite with small amounts of retained austenite and carbide therein.

A completely martensitic core structure is believed to be especially beneficial in track pin bushings. Although the generally accepted metallurgical theory is that a completely martensitic microstructure has brittle behavior, the bushings of the present invention have been found to be decidedly superior in performance to those bushings containing a mixture of martensite and ferrite. Thus, a completely martensitic microstructure in the bushing core does not increase brittleness to a point where it does not resist propagation of cracks starting in the relatively harder case structure 14 and 16.

In any event, the pin bushings are drastically quenched to produce a completely martensitic core structure as noted above. Subsequent the drastic water quench, the hardened pin bushings are tempered by placing them in a furnace at 450° F. for a period of about 70 minutes. This produces a pin bushing wherein the core structure 17 has a hardness ranging between 30 to 45 on the Rockwell C scale. The hardness of the case structure 14 and 16 is a minimum of 58 as measured on the Rockwell C scale.

The ends of the bushings are subsequently induction tempered to a hardness of 35 to 40 on the Rockwell C scale. Thus, as illustrated in the figure, the ends of the bushings are tempered to essentially eliminate the case hardened exterior in order to eliminate the possibility of crack propagation and subsequent failure at the bushing ends.

As a final operation, the bushings are finely end ground to the finished length suitable for the particular track shoe dimensions in which the bushings are to be utilized.

Track pin bushings fabricated from steel and processed as disclosed above, are highly resistant to wear even though heavily loaded in the track structures. Fatigue tests run on the track bushings of the present invention have given results indicating a median life of approximately 295,000 cycles as compared to a bushing life of approximately 60,000 cycles for non-boron containing steel bushings. Further, in notch tensile strength tests, which are further indicative of bushing life, the completely martensitic core bushings of the present invention indicated a strength of about 308,000 p.s.i. whereas non-boron containing bushings of a mixed martensitic and ferrite structure indicated a strength of approximately 280,000 p.s.i.

What is claimed is:

1. A plain low carbon, case hardened, steel track pin bushing comprising a substantially cylindrical shape having a cylindrical longitudinal bore therethrough forming inner and outer exterior portions with a core portion therebetween, said steel being fully killed and containing at least .0005% boron by weight, said core portion of said pin having a completely martensitic microstructure and said exterior portions having a principally martensitic microstructure with small amounts of austenite and carbides admixed therein.

2. The steel track pin bushing of claim 1 wherein said core portion has a Rockwell C hardness of from about 30 to 45 and wherein said exterior portions have a Rockwell C hardness of not less than 58.

3. A steel track pin bushing in accordance with claim 1 wherein the low carbon steel consists essentially of 0.10 to 0.22% carbon by weight, 0.60 to 1.50% manganese by weight, sufficient deoxidizing element to fully kill the steel, and at least 0.0005% boron by weight, with the balance being iron and non-alloying amounts of other elements.

4. The steel bushing of claim 3 wherein said deoxidizing element is silicon.

References Cited by the Examiner

UNITED STATES PATENTS

| | | | |
|---|---|---|---|
| 2,585,372 | 2/1952 | Day et al. | 148—15.5 |
| 2,804,412 | 8/1957 | Anderson | 148—16.5 |

OTHER REFERENCES

Hardenability and Steel Selection, by Walter Crafts et al., pp. 106–108 and 130 relied upon. Publisher: Sir Isaac Pitman and Sons, Ltd., London, 1949.

Mechanical Properties of Low-Carbon, Low-Alloy Steels Containing Boron; by W. E. Bargett et al., Journal of the Iron and Steel Institute. November 1949, p. 277 relied on, pp. 277–292.

Metals Handbook, (1948 Ed.) published by the A.S.M., pp. 684–85 relied upon.

DAVID L. RECK, *Primary Examiner.*